(12) United States Patent
Saneto et al.

(10) Patent No.: US 6,664,472 B2
(45) Date of Patent: Dec. 16, 2003

(54) ELECTRIC CONNECTION BOX FOR AUTOMOBILE

(75) Inventors: Akinori Saneto, Shizuoka-ken (JP); Makoto Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/347,621

(22) Filed: Jan. 22, 2003

(65) Prior Publication Data

US 2003/0155144 A1 Aug. 21, 2003

(30) Foreign Application Priority Data

Feb. 15, 2002  (JP) ........................................ 2002-038451

(51) Int. Cl.[7] ................................................. H02G 3/14
(52) U.S. Cl. ........................... 174/66; 174/67; 220/241; 220/242; 439/139
(58) Field of Search .............................. 174/66, 67, 50, 174/58; 220/241, 242, 4.02; 439/139, 165

(56) References Cited

U.S. PATENT DOCUMENTS 3,106,602 A * 10/1963 Hartz ........................... 174/60
5,518,132 A * 5/1996 Chen ............................ 220/3.8
5,864,091 A * 1/1999 Sumida ......................... 174/50
6,133,531 A * 10/2000 Hayduke et al. .............. 174/67

FOREIGN PATENT DOCUMENTS

| JP | 63-118273 | 7/1988 |
|---|---|---|
| JP | 7-42539 | 8/1995 |
| JP | 8-140240 | 5/1996 |
| JP | 11-18246 | 1/1999 |

* cited by examiner

Primary Examiner—Dhiru R Patel
(74) Attorney, Agent, or Firm—Oblon, Spivak, McClelland, Maier & Neustadt, P.C.

(57) ABSTRACT

The electrical connection box is provided with a movable cover, a fixed cover and a main body housed in the movable cover and the fixed cover. The main body is provided with a maintenance face for the attachment of a wiring and an electrical component and is detachably attached to the movable cover. The movable cover covers the main body so that the maintenance face thereof is exposed. The movable cover slides sideways into the fixed cover and is detachably attached to the fixed cover. The fixed cover covers the maintenance face.

5 Claims, 8 Drawing Sheets

ELECTRIC CONNECTION BOX FOR AUTOMOBILE

BACKGROUND OF THE INVENTION

1. Field of the Invention

The present invention relates to an electric connection box for an automobile such as a junction box, a relay box or a fusible link box, and more specifically relates to a compact electric connection box that occupies as little space in the automobile as possible.

2. Description of the Related Art

A conventional electric connection box for an automobile is provided with an openable cover on a top surface thereof. When performing maintenance, the cover is opened so that electrical components housed in the connection box can be accessed. The conventional electric connection box is typically placed at a side inner surface of an engine room of the automobile in a state where the cover is easily accessed. A related art of the conventional electric connection box is disclosed in Japanese Patent Application Laid Open H11-18246.

SUMMARY OF THE INVENTION

In recent years, the elimination of redundant space in an engine room is diligently pursued. According to the aforementioned disposition of the electrical connection box, dead space in the engine room is not sufficiently utilized. A way of eliminating redundant space is to dispose the electrical connection box in an unutilized dead space, for example, a space between a headlight and a wheel arch.

However, such a disposition makes a maintenance procedure extremely difficult. To access the electrical connection box, it is necessary to remove the headlight, and after performing maintenance, it is necessary to re-install the headlight and adjust a light axis thereof. Such procedure is very troublesome and sometimes causes a malfunction of the electrical connection box and the headlight. More specifically, the conventional electrical connection box cannot be adapted to eliminate redundant space in the engine room.

The present invention is focused on solving the above problem and is intended to increase flexibility of location in the engine room as well as to enable easy maintenance.

An electrical connection box according to the present invention is provided with a movable cover, a fixed cover and a main body housed in the movable cover and the fixed cover. The main body is provided with a maintenance face for attachment of a wiring and an electrical component and the movable cover is detachably attached thereto. The movable cover covers the main body so that the maintenance face thereof is exposed. The movable cover is detachably attached to the fixed cover and the fixed cover covers the maintenance face.

Preferably, the movable cover of the electrical connection box is further provided with a side cover detachably attached to the movable cover so as to cover side surfaces of the main body.

Preferably, an outer surface of the movable cover faces upward and the maintenance face faces downward when the movable cover is attached to the fixed cover.

Preferably, the electrical connection box is further provided with a means for sliding the movable cover and the fixed cover so that the movable cover slides sideways into the fixed cover so as to be attached.

Preferably, the electrical connection box is further provided with a means for engagement of the movable cover and the fixed cover, which is provided with a claw for canceling the engagement, and the movable cover is further provided with a projection for a slide operation thereof. The claw and the projection can be simultaneously operational.

Preferably, inside of the movable cover and the fixed cover is substantially sealed when the movable cover is attached to the fixed cover.

The maintenance face is easily exposed when the movable body is detached from the fixed body and is rotated upside down so that the maintenance procedure can be easily achieved. The movable body can be slid sideways into the fixed body so that the maintenance procedure can be achieved if the electrical connection box is installed where a top surface thereof is covered. The electrical connection box provides a flexibility of location thereof as well as ease of maintenance.

DETAILED DESCRIPTION OF THE PREFERRED EMBODIMENT

Figure 1:
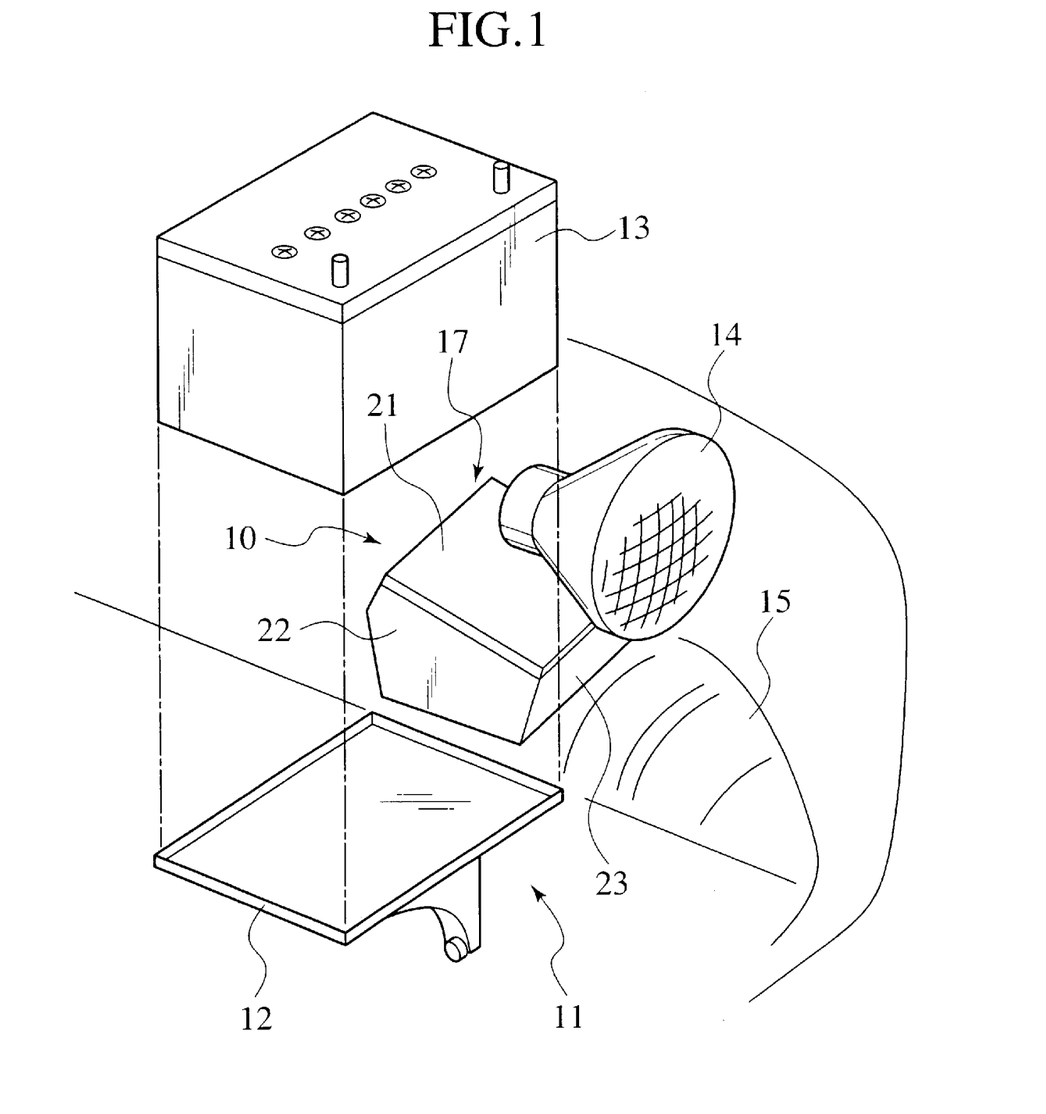
FIG. 1 is an exploded perspective view showing a physical relationship of a battery, a headlight and an electrical connection box according to an embodiment of the present invention.

An electrical connection box 10 is disposed between a headlight 14 and a wheel arch 15 in a vicinity of a battery 13 held on a mount table 12 in an engine room of an automobile body as shown in FIG. 1.

Figure 2:
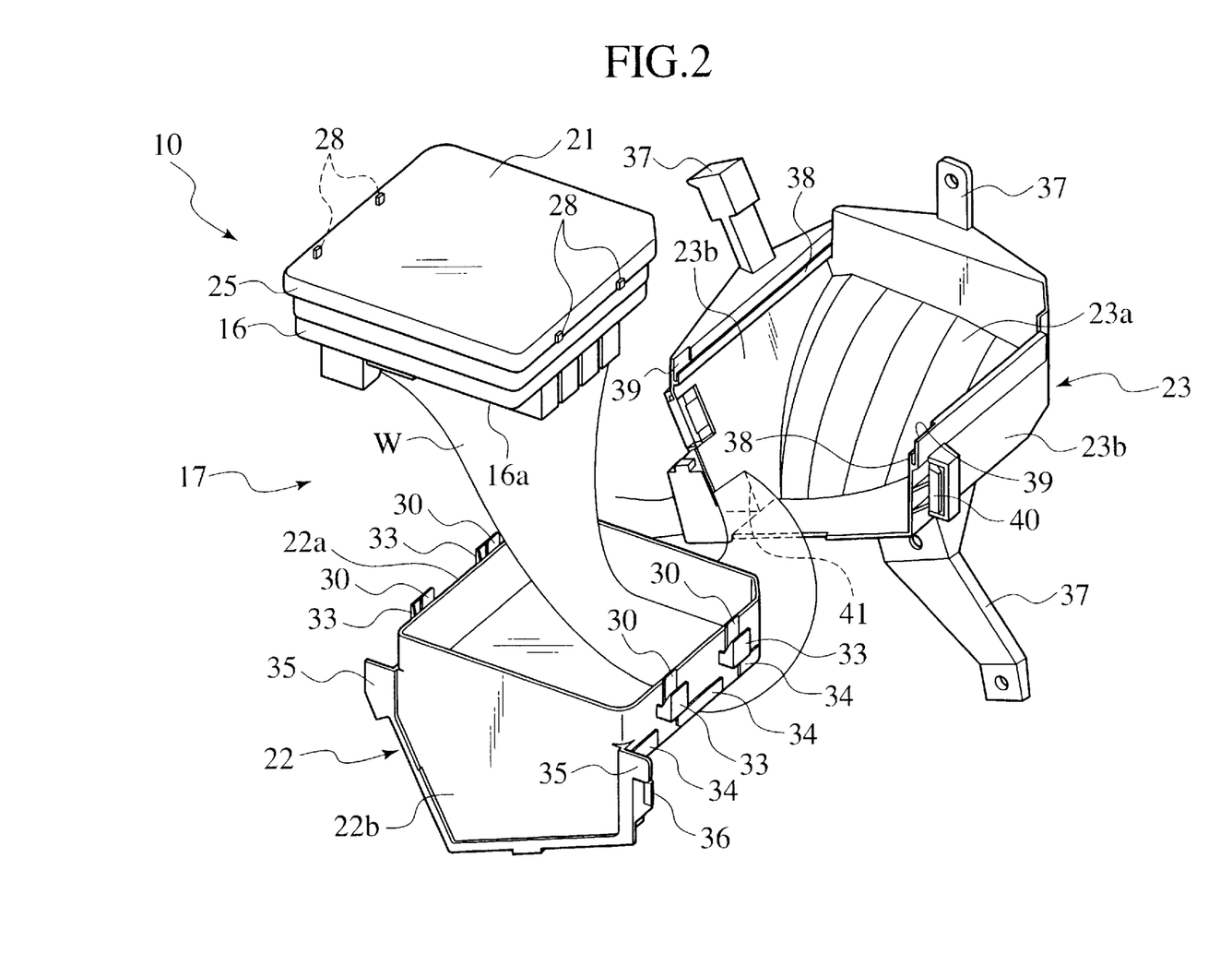
FIG. 2 is an exploded perspective view of the electrical connection box according to the embodiment of the present invention.

The electrical connection box 10 is composed of a main body 16 made of resin housing electrical circuits and a cover 17 housing the main body in an installation state as shown in FIG. 2.

Figure 3:
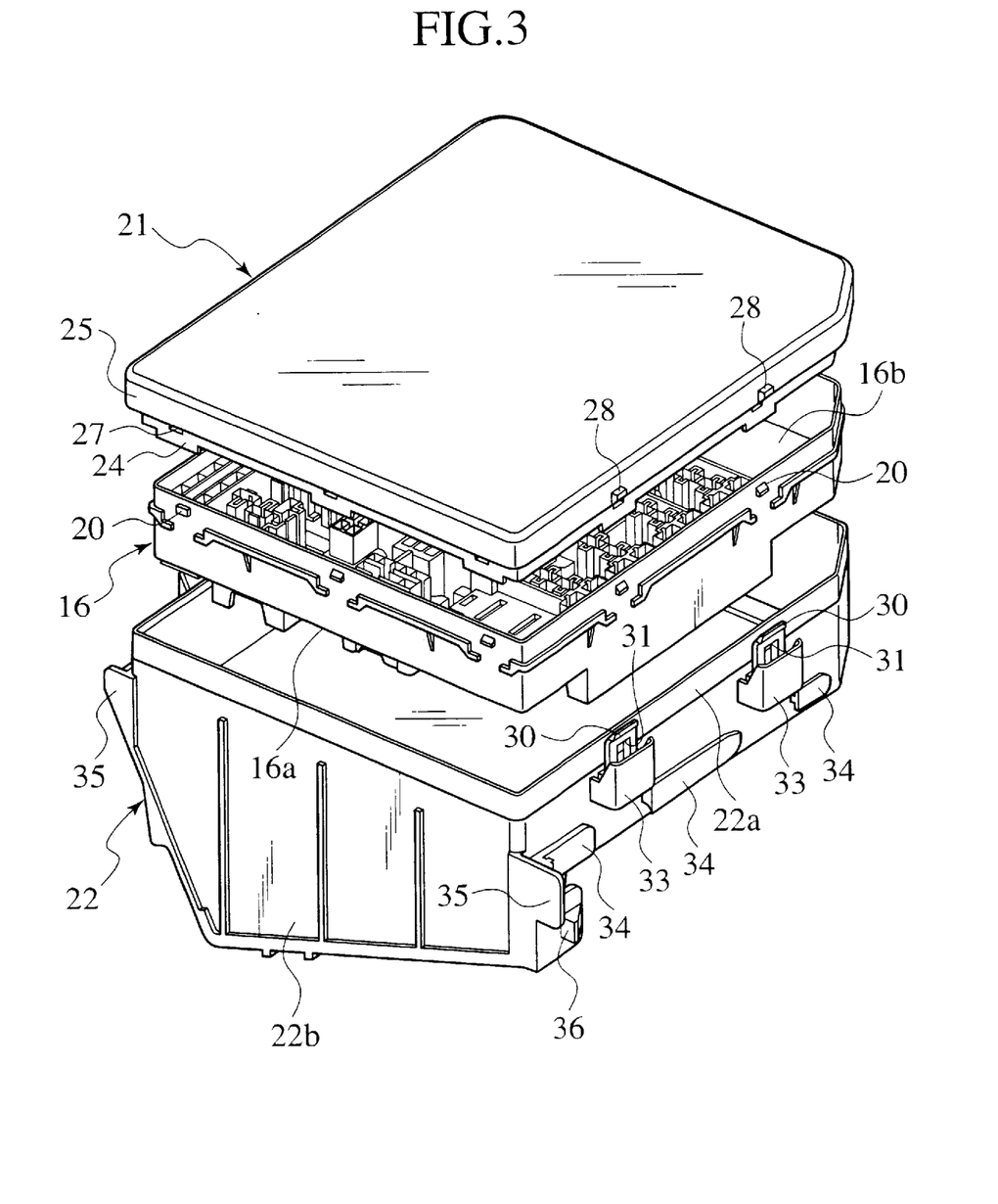
FIG. 3 is an exploded perspective view of a main body, an upper cover and a side cover according to the embodiment of the present invention.
Figure 4:
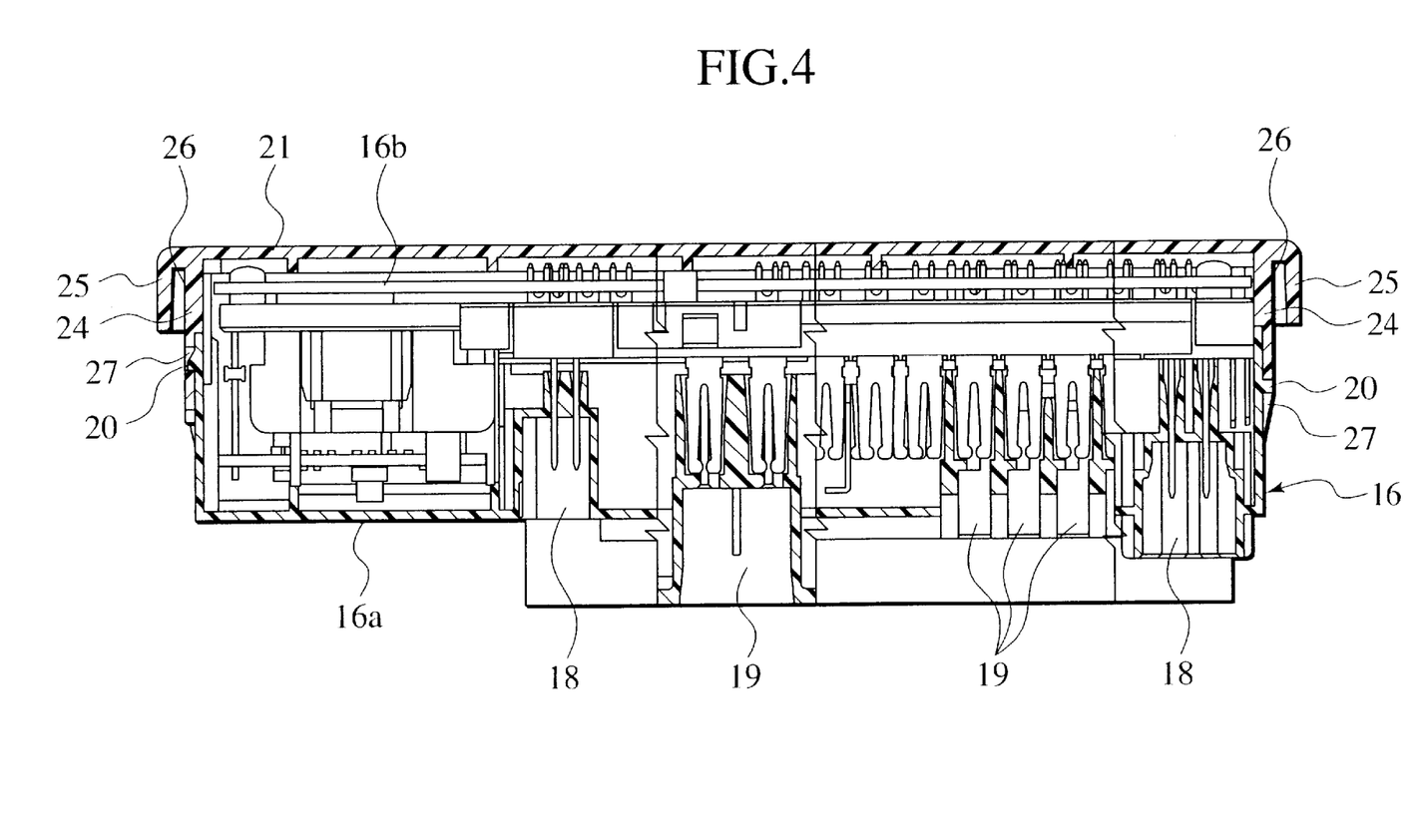
FIG. 4 is a cross sectional view of the main body and the upper cover showing an installation state thereof.

The main body 16 has a flat rectangular cuboid shape as shown in FIGS. 2–4. One of the surfaces of the main body 16 is a maintenance face 16a for performing maintenance on the electrical circuit, which is opposite to a surface facing an upper cover 21 described below and is drawn to be downward in FIG. 2. The maintenance face 16a is provided with connector connection portions 18 for connection with connectors (not shown) of terminal portions of a wiring harness W and electrical components installation portions 19 for installing electrical components such as a relay and a fuse (not shown) thereto. Side surfaces perpendicular to the maintenance face 16a are provided with engagement projections 20 for engaging with the upper cover 21.

Figure 5:
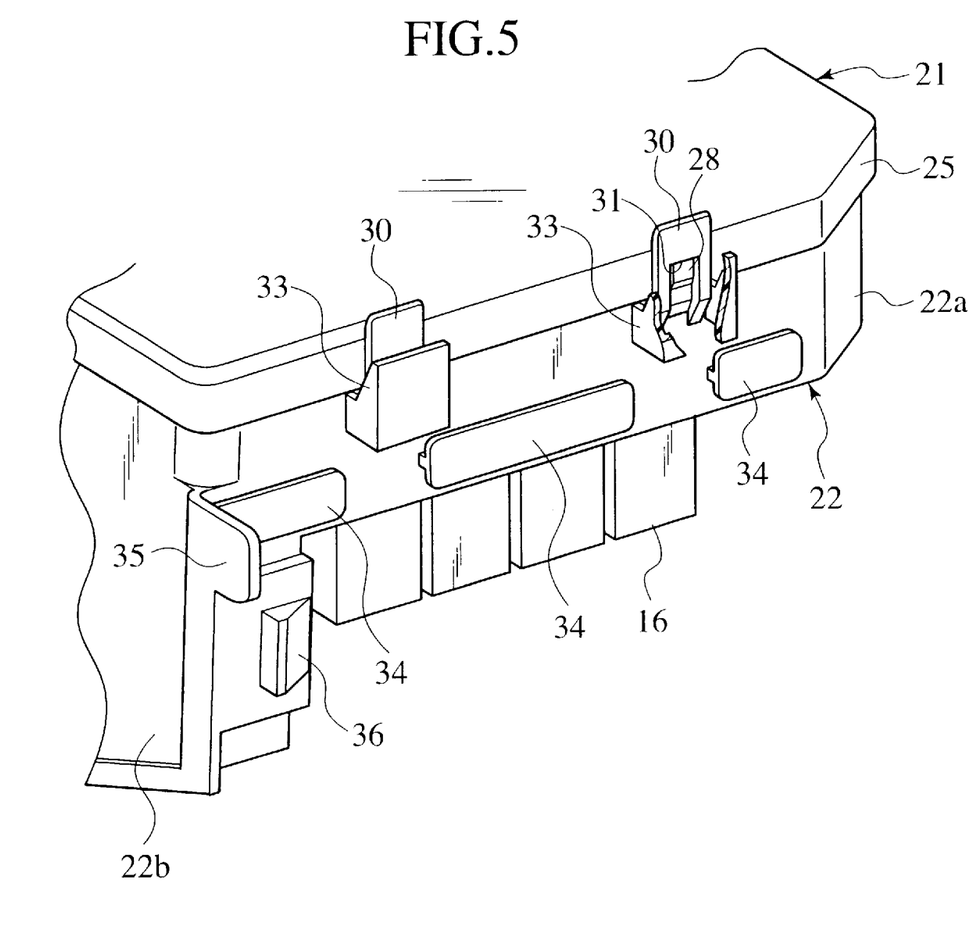
FIG. 5 is a perspective view of a relevant part of the main body and the upper cover showing the installation state.
Figure 6A:
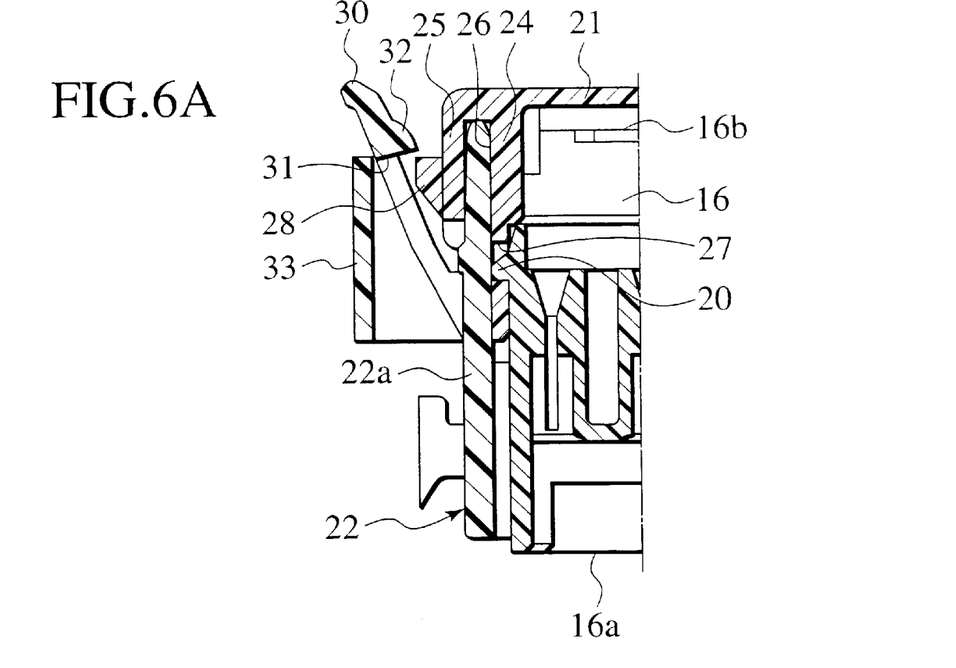
FIG. 6A is a cross sectional view of the main body and the upper cover showing a state just before engagement.
Figure 6B:
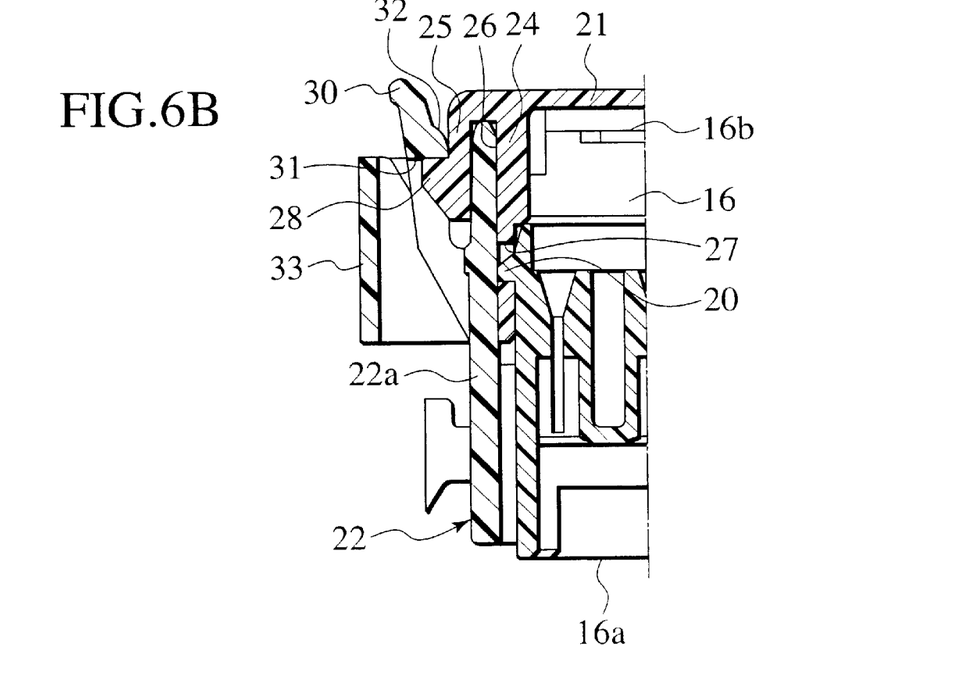
FIG. 6B is a cross sectional view of the main body and the upper cover showing an engaging state thereof.

The cover 17 is composed of the upper cover 21 which is movable, a side cover 22 and an lower cover 23 which is fixed to the engine room. The upper cover 21 is made of a relatively soft material, polypropylene (PP), and has a rectangular plate shape which is slightly larger than an opposite face 16b opposite to the maintenance face 16a of the main body 16. A peripheral edge of the rectangular plate is provided with an inner hanging wall 24 and an outer hanging wall 25 projecting downward. An engaging groove 26 is formed between the inner hanging wall 24 and the outer hanging wall 25. Engagement holes 27 are formed on the inner hanging wall 24 corresponding to the engagement projections 20 so as to engage therewith. The main body 16 is engaged with the upper cover 21 in a state where the opposite face 16b faces to the upper cover 21 thereby the upper cover 21 covers a whole upper surface of the main body 16. Further, latch projections 28 are projected from the outer hanging wall 25 as shown in FIGS. 5 and 6 so that the upper cover 21 can be engaged with the side cover 22.

The side cover 22 is made of a relatively soft material, polypropylene (PP), and is provided with a rectangular frame portion 22a plate shape which is slightly larger than the maintenance face 16a of the main body 16 and a side lid portion 22b integral with and hanging downward from the frame portion 22a. An outer surface of the rectangular frame portion 22a is provided with resilient latch arms 30 extending upward corresponding to the latch projections 28. Each of the resilient latch arms 30 is provided with a latch hole 31 at a proximal side thereof. A distal end of each of the resilient latch arms 30 can elastically deform outward and an inner side thereof is provided with a clicker projection 32 projecting inward. The main body 16 is inserted into the side cover 22 and the latch projections 28 of the upper cover 21 are respectively engaged with the latch holes 31 of the resilient latch arms 30 so that the upper cover 21 is installed to the side cover 22. Thereby the main body 16 is covered by the frame portion 22a.

Furthermore, the resilient latch arms 30 are respectively provided with arm guard walls 33 surrounding thereto so that the resilient latch arms 30 are prevented from over-deforming. The frame portion 22a is provided with a pair of side rails 34 projecting therefrom, running on both sides thereof and substantially vertical to the side lid portion 22b, each of which is composed of three short divided portions. The side cover 22 can be slid into the lower cover 23 by means of the side rails 34 so that the side cover 22 is detachably attached to the lower cover 23. Furthermore the side lid portion 22b is integrally provided with a pair of collar portions 35 and a pair of locking projections 36 at both ends thereof.

The lower cover 23 has a box-like shape. An upper surface, which faces to the headlight 14, and a side surface, which faces to the battery 13, of the lower cover 23 are opened so as to receive the upper cover 21 and the main body 16. A bottom surface 23a thereof is spherically shaped so as not to interfere with the wheel arch 15. The lower cover 23 is fixed to an inner surface of the engine room 11 by means of plural bracket portions 37 as shown in FIG. 2.

Both side wall portions 23b of the lower cover 23 are respectively provided with a pair of lower side rails 38 projecting inward and running in a substantially horizontal level on the inner surfaces thereof. Guide faces 39 for guiding insertion of the side rails 34 of the side cover 22 are respectively provided in the vicinity of ends of the lower side rails 38. The side rails 34 are guided by the guide faces 39 so as to be slid into the lower side rails 38, thereby the upper cover 21 and the side cover 22 are moved into the lower cover 23 at an installation position. Adversely, the upper cover 21 and the side cover 22 can be slid out from the lower cover 23 by sliding the side rails 34 on the lower side rails 38. More specifically, the upper cover 21 and the side cover 22 can be detachably attached to the lower cover 23 by means of the side rails 34 and the lower side rails 38. Furthermore, at the installation position, the opened surfaces of the lower cover 23 is covered with the upper cover 21 and the side cover 22 so that the main body 16 is housed so as to be substantially sealed in the cover 17.

The pair of side wall portions 23b of the lower cover 23 are respectively provided with resilient locking projections 40 in a vicinity of the opened surfaces thereof, with which the locking projections 36 of the side cover 22 are respectively engaged so that the side cover 22 is detachably fixed to the lower cover 23 at a covering position. A harness insertion hole 41 is formed on one of the side wall portions 23b of the lower cover 23 so that the wiring harness W can be conducted into the lower cover 23. Connectors (not shown) of the wiring harness W are connected to the connector connection portions 18 of the main body 16.

An installation method of the electrical connection box 10 will be described hereinafter.

First, as shown in FIG. 2, the main body 16 is disposed inside the upper cover 21 as the maintenance face 16a thereof faces downward. The main body 16 is inserted to the inner hanging wall 24 of the upper cover 21 so that the engagement projections 20 of the main body 16 are respectively engaged with the engagement holes 27 of the upper cover 21 and the main body 16 is fixed to the upper cover 21.

Next, the side cover 22 is inserted below the upper cover 21 to which the main body 16 is fixed and an upper end of the frame portion 22a is inserted into the engaging groove 26 of the upper cover 21. Thereby the tip ends of the resilient latch arms 30 of the side cover 22 respectively abut the latch projections 28 of the upper cover 21 so as to elastically deform outward and allow an insertion of the side cover 22. When the resilient latch arms 30 are further inserted so that the latch holes 31 thereof match the latch projections 28 as shown in FIG. 6(a), the resilient latch arms 30 elastically deform to restore to the original position so that the latch holes 31 of the resilient latch arms 30 are respectively engaged with the latch projections 28. Finally, the side cover 22 is fixed to the upper cover 21.

On the other hand, the lower cover 23 is fixed to a predetermined position in the engine room 11 via the respective bracket 37. The wiring harness W is conducted into the lower cover 23 and the connectors provided to the terminal portions of the wiring harness W are connected to the connector connection portions 18. Next, electrical components are respectively installed to the electrical components installation portions 19 of the main body 16. The installation procedure may be achieved any time before the side cover 22 is inserted into the lower cover 23.

Figure 7:
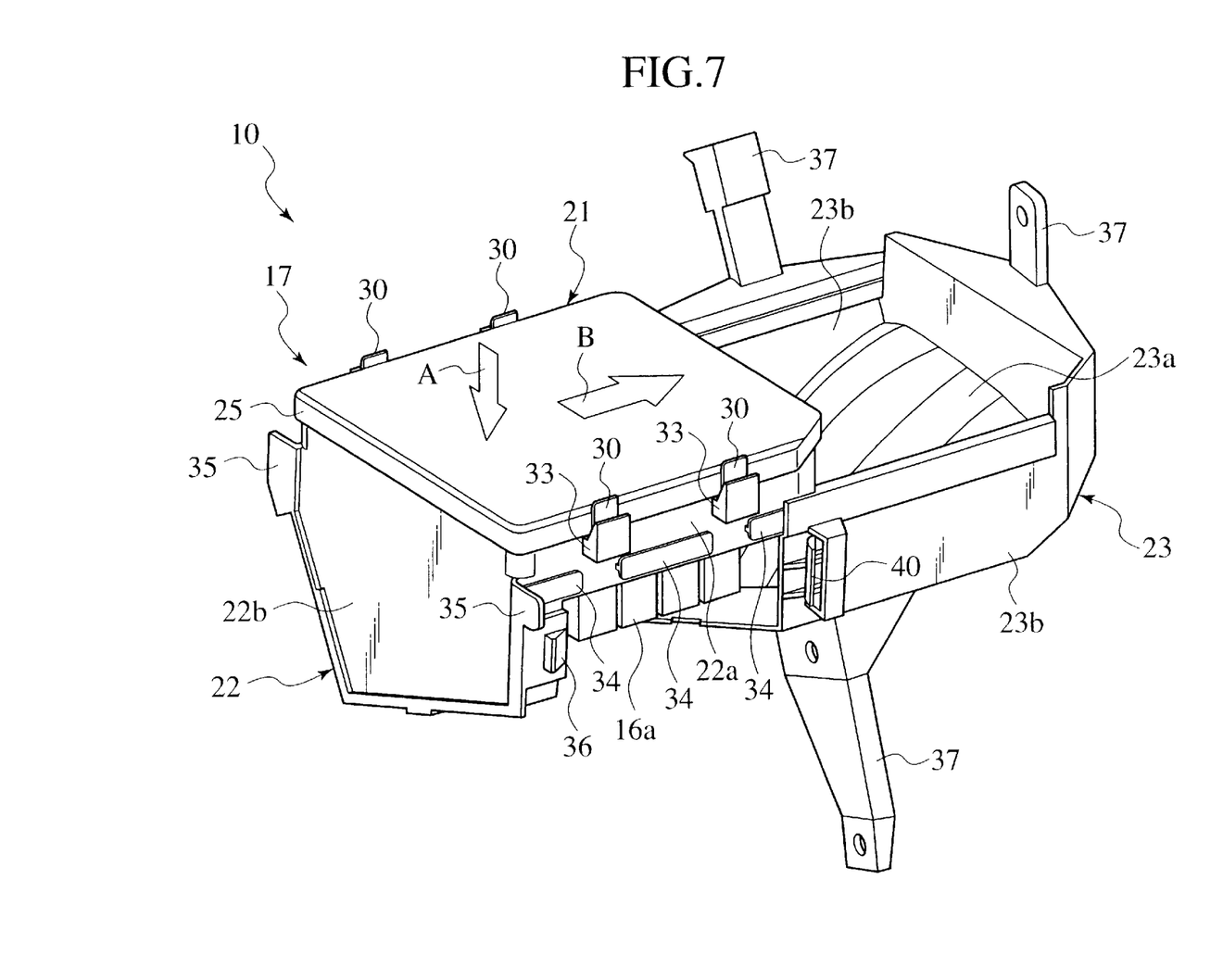
FIG. 7 is a perspective view of the electrical connection box according to the embodiment of the present invention showing an installation procedure of the upper cover to a lower cover.

Next, movable bodies such as the side cover 22 are moved from an upper and front side of the lower cover 23 in a direction of an arrow A shown in FIG. 7 so that tip ends of the pair of side rails 34 are inserted into the pair of the guide surfaces 39 of the lower cover 23. Then the pair of the side rails 34 slidably touch with the pair of lower side rails 38. Next, the movable bodies are pressed in a direction of an arrow B shown in FIG. 7 so that the side cover 22 slides side ways into the lower cover 23. When the side cover 22 reaches the installation position, the locking projections 36 of the side cover 22 are respectively latched with the resilient locking projections 40 of the lower cover 23 and thereby the side cover 22 is locked with the lower cover 23.

A maintenance procedure of the electrical connection box 10 placed in the predetermined position in the automobile will be described hereinafter.

Figure 8:
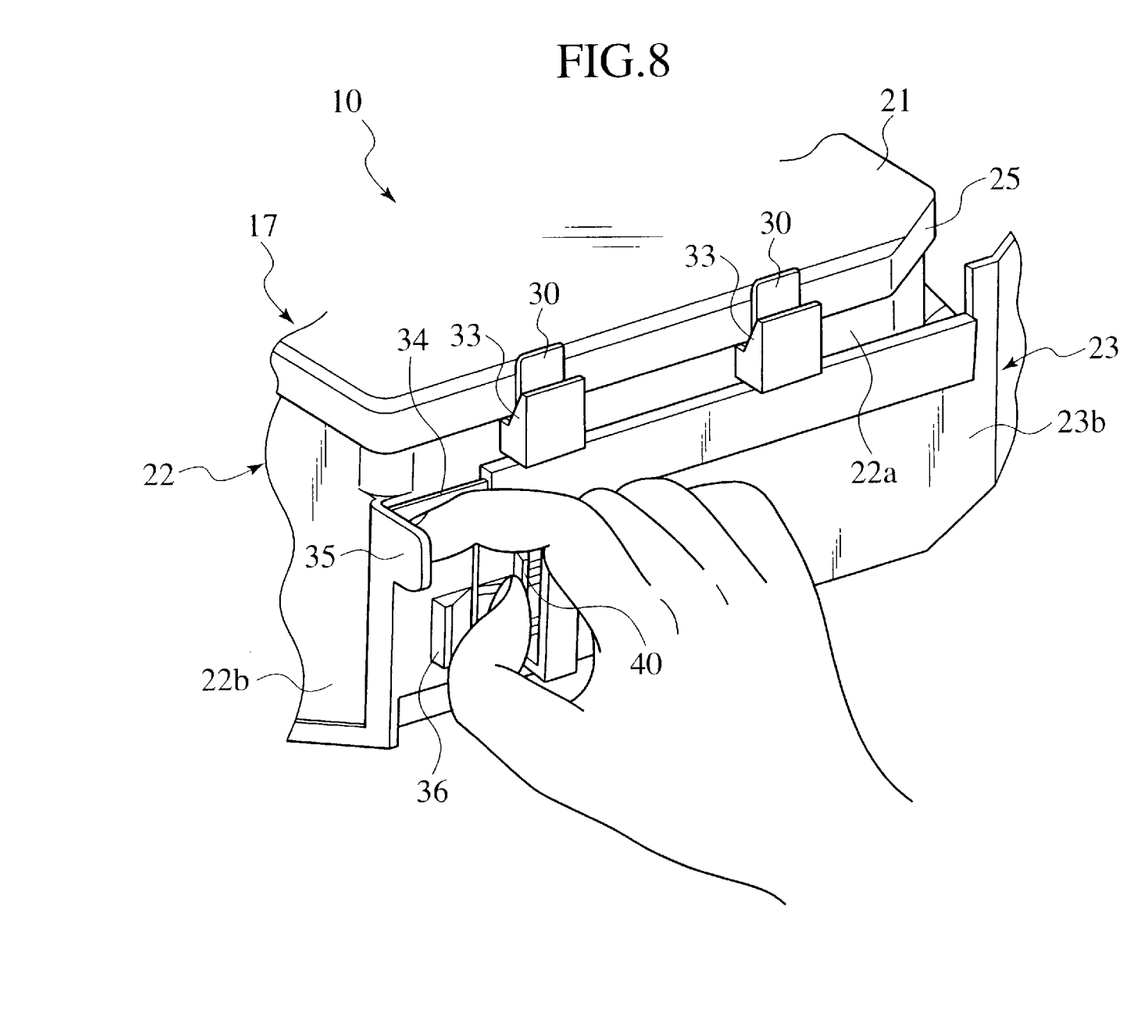
FIG. 8 is a perspective view of the electrical connection box according to the embodiment of the present invention showing a disinstallation procedure of the upper cover from the lower cover.

First, the battery 13 placed on the mount table 12 in the engine room 11 is elevated upward. The resilient locking projections 40 of the lower cover 23 can be deformed with operator's thumbs as shown in FIG. 8 so that the engagements are cancelled. Subsequently, the pair of collar portions 35 of the side cover 22 are pulled with his forefingers. Then the side cover 22 slides out of the lower cover 23 and the movable bodies such as the side cover 22 are extracted so as to be accessible. The extracted upper cover 21 can be rotated so that the maintenance face 16 of the main body 16 faces upward and the maintenance work can be achieved.

As described above, the electrical connection box 10 of the present invention can be installed into intricate places in the engine room such as a space below the headlight without damaging the ease of maintenance work. Therefore the present invention contributes to the elimination of redundant space in the engine room. The electrical connection box 10 can be installed not only below the headlight but also any in intricate place where a space for maintenance can be afforded in the vicinity. The present invention increases flexibility of location in the engine room and enables easy maintenance. Furthermore, the connector connection portions 18 and the electrical components installation portions 19 are simultaneously provided for maintenance because the maintenance face 16a is provided with both the elements.

The contents of Japanese Patent Application No. 2002-038451 (filed on Feb. 15, 2002) are incorporated herein by reference in its entirety.

Any element in a claim that does not explicitly state "means for" performing a specified function is not to be interpreted as a "means" clause as specified in 35 U.S.C. 112, paragraph 6.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An electrical connection box comprising:

a main body comprising a maintenance face for attachment of a wiring and an electrical component;

a movable cover detachably attached to and covering the main body so as to leave the maintenance face exposed;

a side cover detachably attached to the movable cover so as to cover side surfaces of the main body; and a fixed cover detachably attached to the side cover and covering the maintenance face, wherein the main body is housed within the moveable cover such that the moveable cover including the main body may be detachably attached from the side cover so as to have access to the maintenance face exposed.

2. The electrical connection box of claim 1, wherein:

an outer surface of the movable cover faces upward and the maintenance face faces downward when the movable cover is attached to the fixed cover.

3. The electrical connection box of claim 1, wherein:

the movable cover including the main body engages with the side over and slides sideways into the fixed cover so as to be attached.

4. The electrical connection box of claim 3, further comprising:

an engagement mechanism configured to engage the movable cover and the fixed cover and including a claw configured to cancel the engagement, the movable cover further comprising a projection for a slide operation thereof and the claw and the projection can be simultaneously and manually operated.

5. The electrical connection box of claim 1, wherein:

the side cover is attached to the fixed cover so that an inside of the moveable cover is substantially sealed.

* * * * *

UNITED STATES PATENT AND TRADEMARK OFFICE
CERTIFICATE OF CORRECTION

PATENT NO. : 6,664,472 B2
DATED : December 16, 2003
INVENTOR(S) : Akinori Saneto et al.

It is certified that error appears in the above-identified patent and that said Letters Patent is hereby corrected as shown below:

<u>Column 6,</u>
Line 31, change "over" to -- cover --

Signed and Sealed this

Twenty-second Day of June, 2004

JON W. DUDAS
*Acting Director of the United States Patent and Trademark Office*